Jan. 15, 1924.
M. A. BUCH
BODY FOR MOTOR VEHICLES
Filed Feb. 27, 1923
1,481,048
3 Sheets-Sheet 1
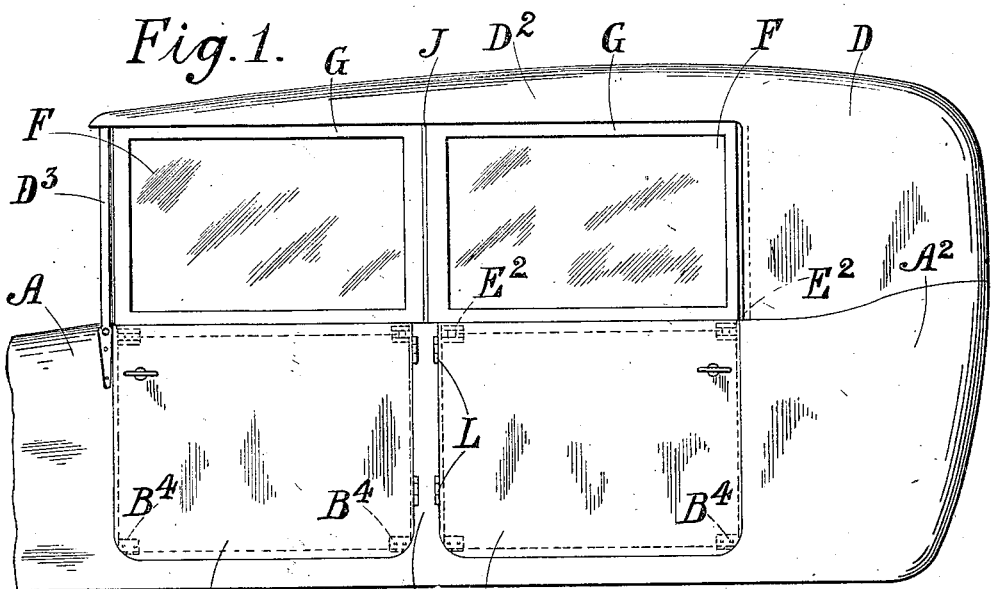
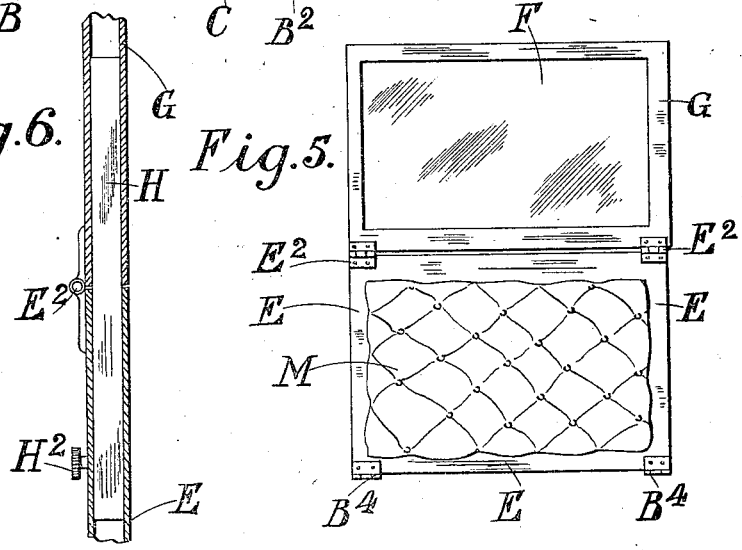
INVENTOR
MAX A. BUCH
PER
Spear, Middleton, Donaldson & Hall
ATTORNEY.

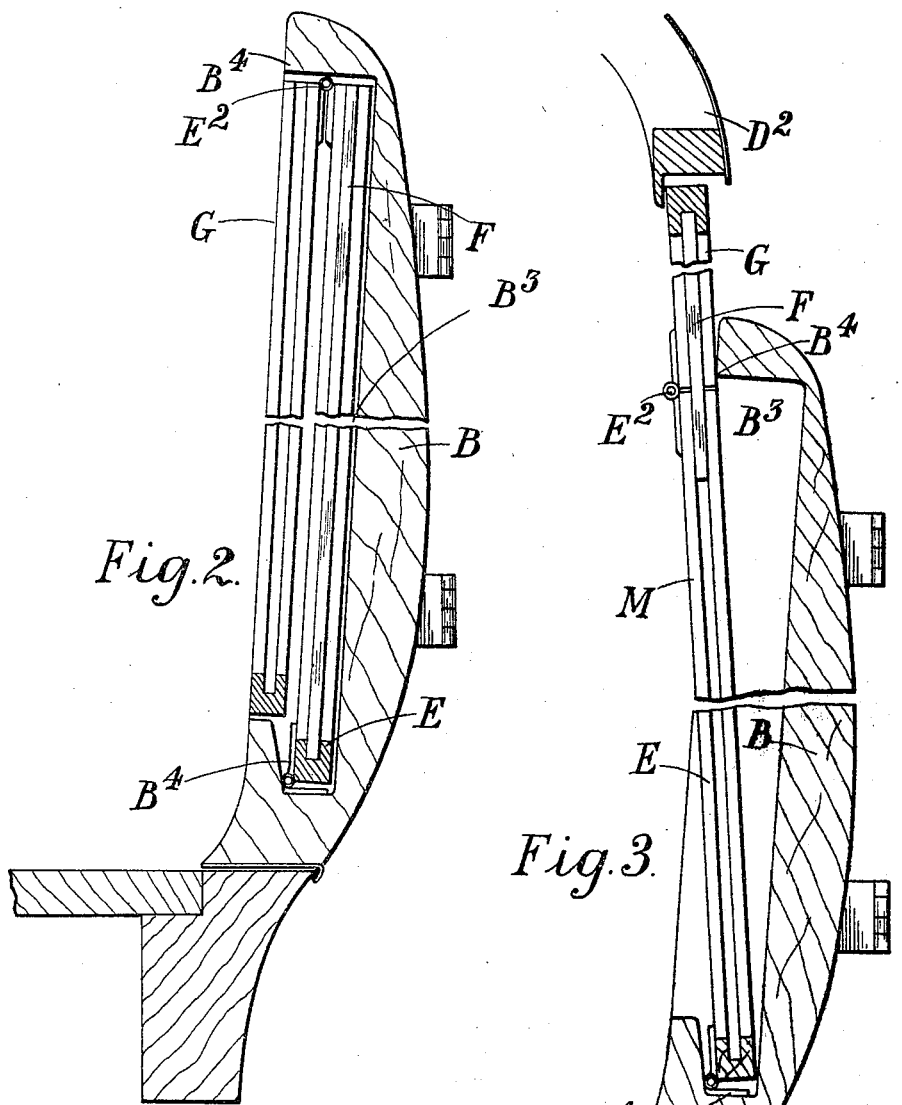

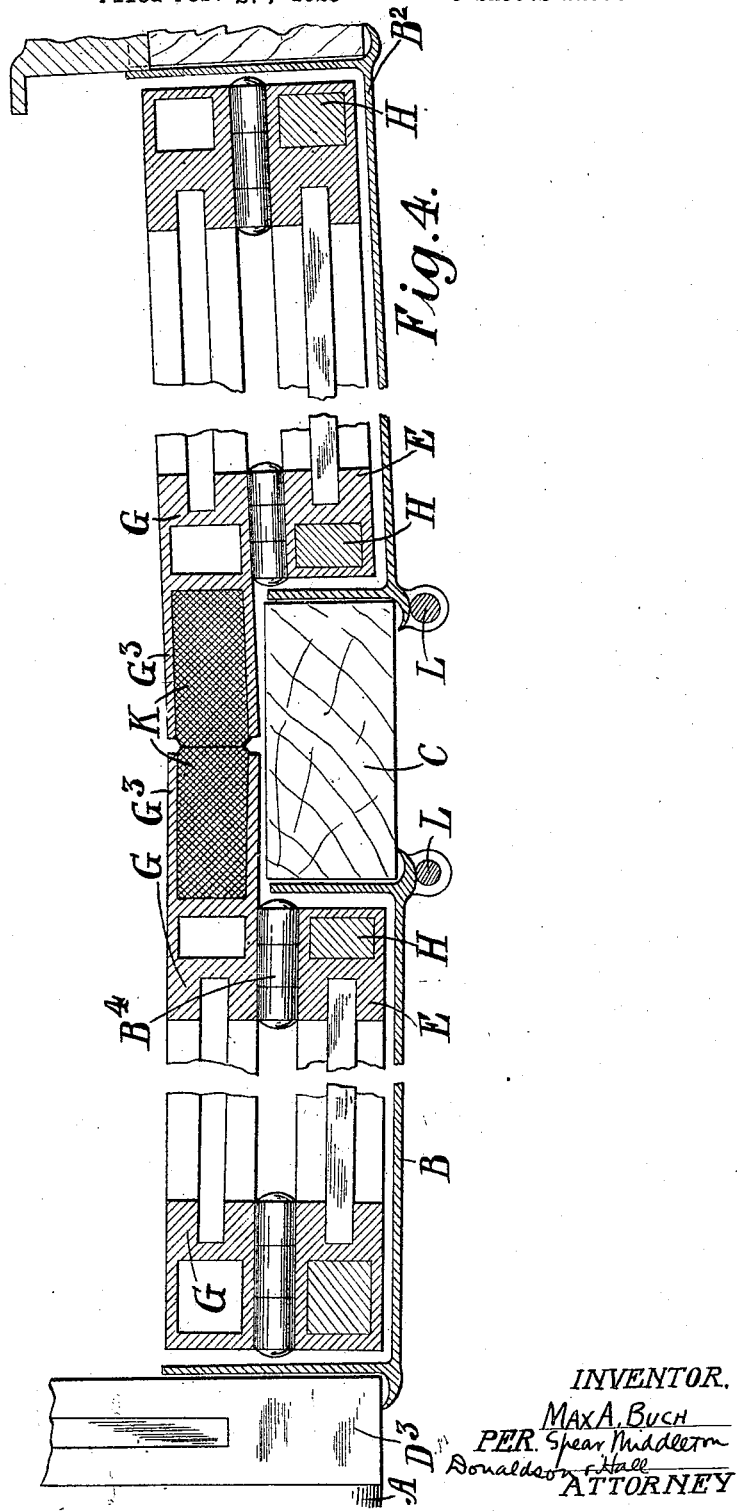

Patented Jan. 15, 1924.

1,481,048

UNITED STATES PATENT OFFICE.

MAX ALVINUS BUCH, OF COVENTRY, ENGLAND.

BODY FOR MOTOR VEHICLES.

Application filed February 27, 1923. Serial No. 621,609.

*To all whom it may concern:*

Be it known that I, MAX ALVINUS BUCH, a German subject, residing at Coventry, in the county of Warwick, England, have invented certain new and useful Improvements in Bodies for Motor Vehicles, of which the following is a specification.

This invention relates to bodies for motor vehicles preferably of the kind in which each body side, from the dashboard (or scuttle) to the rear quarter (i. e. the panel and framework at the ends of the rear seats), comprises a pair of doors hinged back to back to a pillar or the like. The object of the invention is to provide simple means for carrying vertically sliding windows chiefly so as to provide a body "of the all-weather type," i. e. that which can be completely open or completely closed at will. For this purpose there is generally employed in motor bodies a hood, the main pillar of which is pivoted to the body sides behind the rear door, and the hood has an extension which lies over the main part of the body and is secured at the front to the windscreen.

In the accompanying drawings, which illustrate the preferred method of carrying out the invention as applied to a body of the type referred to, Figure 1 is a side view of the complete body completely closed.

Figure 2 is a broken view on a larger scale through one door showing the window parts out of use.

Figure 3 is another view of the same showing the window raised, and part of the hood.

Figure 4 is a horizontal section broken at two points showing the whole of one body side from the windscreen at the front to the commencement of the rear quarter at the back.

Figure 5 is a face view of one of the complete window elements.

Figure 6 is a sectional view showing a detail.

Like letters indicate like parts throughout the drawings.

The type of body to which this invention chiefly, though not exclusively, applies, is that in which the body sides from the back of the scuttle or dashboard A to the front of the rear quarter $A^2$ is composed of two doors, B, $B^2$ hinged back to back to a pillar or standard C. On the rear quarter $A^2$ is mounted a hood D having a forward extension $D^2$ the frame of which is secured to the windscreen pillars $D^3$. This hood may be of the ordinary cape hood type or of any other suitable form. As each of the doors and window elements are alike only one need be described, and their construction and arrangement are as follows:—

In each door is formed a deep recess $B^3$ practically the whole width of the door, and to the bottom of each recess are attached hinges $B^4$ secured to a frame E. The frame is of channel section as is clearly shown in Figures 2, 3 and 4 adapted to receive a sliding window F. The frame may be made up of some well-known material for this purpose, which is generally lined with felt or the like.

To the upper ends of the frame E are further hinges $E^2$ to which is attached a second frame G very similar to the frame E. As an alternative to hinging the frame G to the frame E the former may be hinged to the corner $B^4$ of the recess $B^3$ on the door.

It will be clear that when the frame G is hinged downwards and both frames are pushed as far as possible into the recess $B^3$, as is shown in Figure 2, the complete window element is practically concealed, and when all four windows are dealt with in this manner, and the hood lowered, the body is completely open.

To close the body, the hood is first raised in the usual manner, and each window element in turn is dealt with as follows:—
First, the door is opened and the two frames are pulled out of the recess, turning about their hinges $B^4$. Then the upper frame G is turned about its hinge $E^2$ to bring it into line with the frame E, and the two are locked in line, and then the glass F is raised, sliding up out of the frame E into the frame G. The means for raising the glass, such as a strap or the like, are omitted for the sake of clearness, as also are such details as a clip or the like for holding the frames in the position shown in Figure 3 and also for securing it in the position shown in Figure 2.

It will be seen that the upper edge of the frame G practically meets the edge of the hood $D^2$ so that the body is completely enclosed. To lock the frames in line, as shown in Figure 3, there may be employed a sliding locking bolt H provided with a knob $H^2$. This is adapted to slide in suitable passages in the frames G and E, and it will be clear that when the bolt is in the position shown in Figure 6 the windows are rigidly in line, and that when the bolt is pushed down to disengage completely from the upper frame G, then the latter can be turned above the hinge E².

It is important that there should be a draught and weathertight joint along the line J, Figure 1, between the abutting edges of the window frames G. For this purpose the frames G are provided with channel-like extensions G³, which may be filled with rubber or felt K, this resilient material projecting slightly from the channels G³. Thus when the doors B B² move about their hinges L these resilient strips K compress against one another, and the desired draught-tight joint is obtained when the body is closed. When the frames G are folded down, as in Figure 2, the strips K still abut against one another, and by this means prevent rattle or vibration of the window frames.

To provide a neat appearance the face of the frame E along the line M (Figure 3) will be covered over with a facing of suitable trimming. This trimming is omitted in Figure 3 but is shown in Figure 5. When the frame G is lowered this trimming will still provide a neat appearance and correspond with the trimming usually employed upon vehicle doors.

The main features of the invention when applied to a body of the type referred to, are that there are no pillars between the main hood stick and the windscreen pillar, and that the whole of this space can be enclosed by two windows and their frames which are carried by the doors, and these windows are adjustable vertically.

By this means it is possible so to adapt a body of the kind referred to that it can be completely closed or open at will, all the windows are adjustable vertically and are carried permanently on the body. Any one window can be raised without the hood requiring to be raised, very large windows are obtainable and the construction is simple and neat in appearance.

What I claim as my invention and desire to secure by Letters Patent of the United States is:—

The combination with a door forming part of the side of a body, a recess in said door, a lower frame part of channel section and hinged to the bottom of said recess and lying flush against the back of the recess when closed, an upper frame part also of channel section and hinged at the bottom to said lower frame part and lying flush against the inner side of the lower frame, a window adapted to slide in said channel parts when said frames are arranged in line with one another, and means for locking said frames in line with one another, substantially as set forth.

In testimony whereof I have signed my name to this specification in the presence of two subscribing witnesses.

MAX ALVINUS BUCH.

Witnesses:
JOHN ARKLE,
EVA COLLIER.